United States Patent
Morita et al.

(10) Patent No.: US 12,040,671 B2
(45) Date of Patent: Jul. 16, 2024

(54) MOTOR COIL SUBSTRATE COMPRISING FLEXIBLE SUBSTRATE AND COILS AND MOTOR FORMED THEREOF

(71) Applicant: IBIDEN CO., LTD., Gifu (JP)

(72) Inventors: Haruhiko Morita, Ogaki (JP); Hitoshi Miwa, Ogaki (JP); Shinobu Kato, Ogaki (JP); Toshihiko Yokomaku, Ogaki (JP); Hisashi Kato, Ogaki (JP); Takahisa Hirasawa, Ogaki (JP); Tetsuya Muraki, Ogaki (JP); Takayuki Furuno, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 61 days.

(21) Appl. No.: 17/363,182

(22) Filed: Jun. 30, 2021

(65) Prior Publication Data
US 2022/0021262 A1    Jan. 20, 2022

(30) Foreign Application Priority Data

Jul. 17, 2020 (JP) .................................. 2020-122785

(51) Int. Cl.
*H02K 3/26* (2006.01)
*H02K 3/28* (2006.01)

(52) U.S. Cl.
CPC .................. *H02K 3/26* (2013.01); *H02K 3/28* (2013.01); *H02K 2203/03* (2013.01)

(58) Field of Classification Search
CPC ........ H02K 3/26; H02K 3/28; H02K 2203/03; H02K 2213/03; H02K 3/47
See application file for complete search history.

(56) References Cited

U.S. PATENT DOCUMENTS

| 3,736,543 | A  | * | 5/1973 | Lademann | ............ | H01F 41/041 336/200 |
| 11,283,317 | B2 | * | 3/2022 | Morita | ..................... | H02K 3/26 |
| 2009/0072651 | A1 | * | 3/2009 | Yan | ..................... | H02K 15/0407 336/200 |
| 2010/0007230 | A1 | * | 1/2010 | Suzuki | ..................... | H02K 3/47 310/90 |
| 2011/0133591 | A1 | * | 6/2011 | Yan | ......................... | H02K 3/47 310/198 |
| 2013/0009511 | A1 | * | 1/2013 | Dieleman | ................ | H02K 3/26 29/596 |

FOREIGN PATENT DOCUMENTS

JP         2007-124892 A    5/2007
WO    WO-2012142165 A2 *  10/2012   ............... H02K 3/26

* cited by examiner

*Primary Examiner* — Bernard Rojas
(74) *Attorney, Agent, or Firm* — Oblon, McClelland, Maier & Neustadt, L.L.P.

(57) ABSTRACT

A motor coil substrate includes a flexible substrate, and coils formed on the flexible substrate. The flexible substrate is wound N times where N is 2 or larger, the coils are formed in a multiple of 3, the flexible substrate includes a first flexible substrate and a second flexible substrate extending from the first flexible substrate and wound around the first flexible substrate, the flexible substrate has a first end and a second end on an opposite side with respect to the first end such that the first flexible substrate has a first end of the flexible substrate, the second flexible substrate is positioned on an outer side of the first flexible substrate, and the coils are formed such that a coil or coils formed on the first flexible substrate partially overlap with a coil or coils formed on the second flexible substrate.

20 Claims, 5 Drawing Sheets

MOTOR COIL SUBSTRATE COMPRISING FLEXIBLE SUBSTRATE AND COILS AND MOTOR FORMED THEREOF

CROSS-REFERENCE TO RELATED APPLICATIONS

The present application is based upon and claims the benefit of priority to Japanese Patent Application No. 2020-122785, filed Jul. 17, 2020, the entire contents of which are incorporated herein by reference.

BACKGROUND OF THE INVENTION

Field of the Invention

The present invention relates to a motor coil substrate and a motor.

Description of Background Art

Japanese Patent Application Laid-Open Publication No. 2007-124892 relates to an electric motor, which includes multiple single coils formed of wires. The entire contents of this publication are incorporated herein by reference.

SUMMARY OF THE INVENTION

According to one aspect of the present invention, a motor coil substrate includes a flexible substrate, and coils formed on the flexible substrate. The flexible substrate is wound N times where N is 2 or larger, the coils are formed in a multiple of 3, the flexible substrate includes a first flexible substrate and a second flexible substrate extending from the first flexible substrate and wound around the first flexible substrate, the flexible substrate has a first end and a second end on an opposite side with respect to the first end such that the first flexible substrate has a first end of the flexible substrate, the second flexible substrate is positioned on an outer side of the first flexible substrate, and the coils are formed such that a coil or coils formed on the first flexible substrate partially overlap with a coil or coils formed on the second flexible substrate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments will now be described with reference to the accompanying drawings, wherein like reference numerals designate corresponding or identical elements throughout the various drawings.

Figure 3:
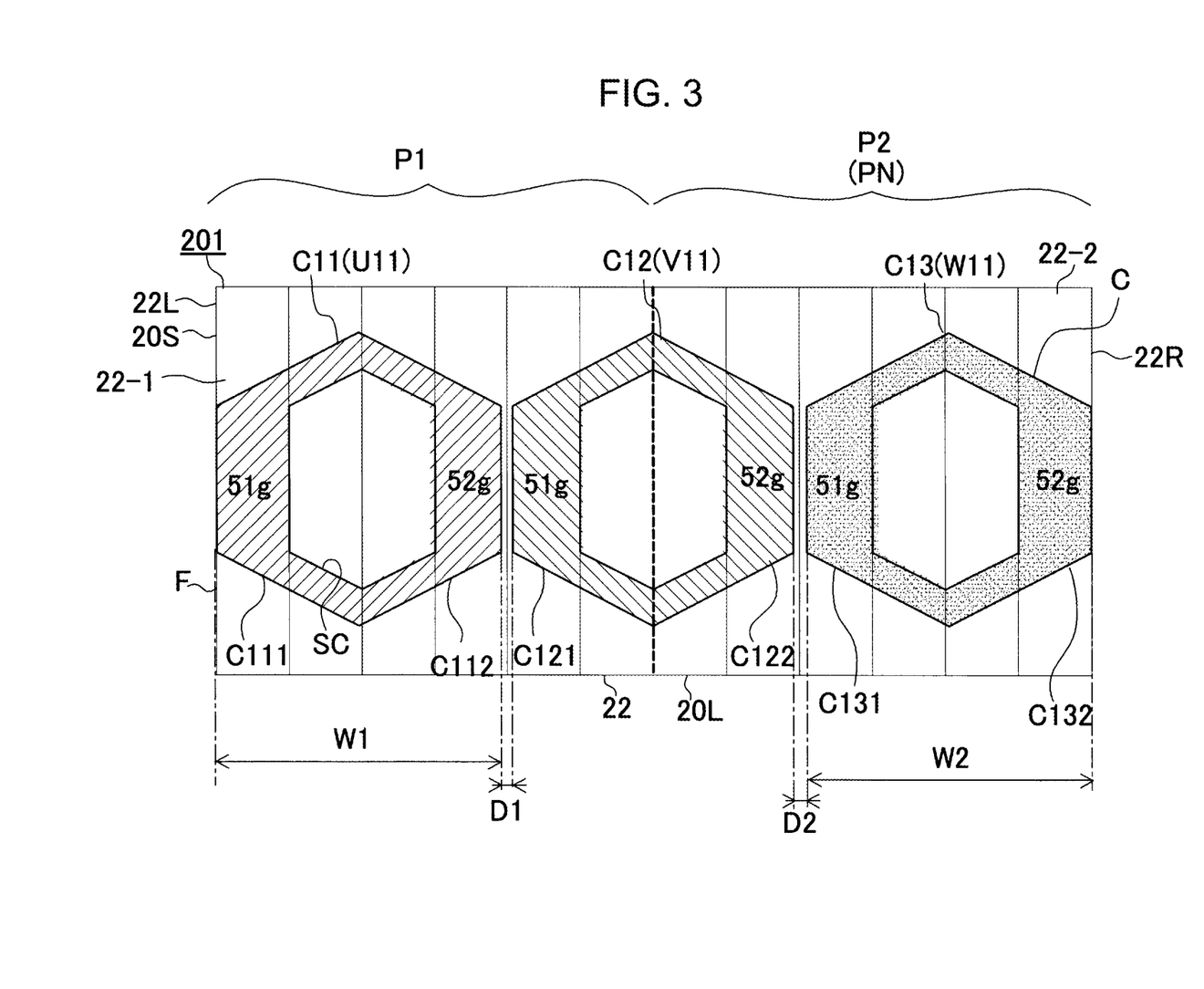
FIG. 3 illustrates a coil substrate according to the embodiment of the present invention.

A coil substrate 201 illustrated in FIG. 3 is prepared. The coil substrate 201 is formed to include: a flexible substrate 22 having a first surface (F) and a second surface (S) on an opposite side with respect to the first surface (F); and coils (C) (C11, C12, C13) on the first surface (F) of the flexible substrate 22. By winding the coil substrate 201, a motor coil substrate 20 illustrated in FIG. 1B is obtained. For example, the coil substrate 201 is wound in a tubular shape. The motor coil substrate 20 is wound around a hollow space (AH). For example, the motor coil substrate 20 has a tubular shape. The number of windings (N) is 2 or more and 5 or less. FIG. 1B is a schematic diagram.

Figure 1A:
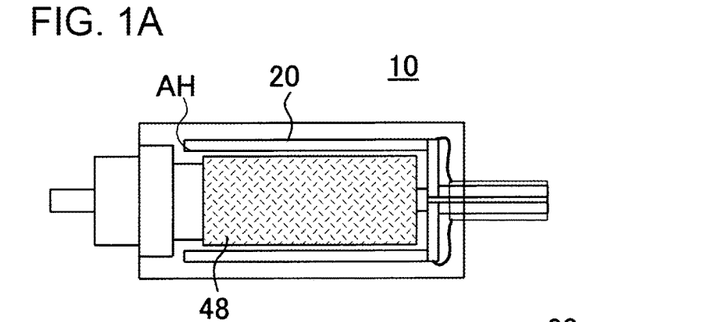
FIG. 1A is a schematic diagram of a motor according to an embodiment of the present invention.
Figure 1B:
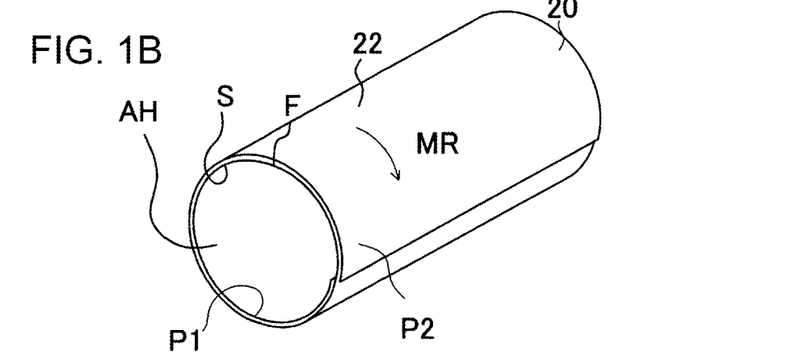
FIG. 1B is a schematic diagram of a motor coil substrate of the embodiment.

As illustrated in FIG. 1A, a motor 10 is obtained by placing a magnet 48 inside the motor coil substrate 20. FIG. 1A is a schematic diagram. The motor coil substrate 20 is positioned around the magnet 48 via a hollow space (AH). An example of the motor 10 is a brushless motor. In an embodiment, the magnet 48 rotates. However, it is also possible that the motor coil substrate 20 rotates.

As illustrated in FIG. 3, the flexible substrate 22 preferably has short sides (20S) and long sides (20L). The flexible substrate 22 has a one-end (22L) and an other-end (22R) on an opposite side with respect to the one-end (22L). One of the short sides (20S) also serves as the one-end (22L). The coils (C) (C11, C12, C13) are formed along the long sides (20L) of the flexible substrate 22. The coils (C) are formed in one row from the one-end (22L) to the other-end (22R) of the flexible substrate 22. The first coil (C11) (U11) is a U-phase coil. The second coil (C12) (V11) is a V-phase coil. The third coil (C13) (W11) is a W-phase coil. The U-phase coil, the V-phase coil and the W-phase coil are positioned in the order of the U-phase coil (U11), the V-phase coil (V11), and the W-phase coil (W11), and the coil (C) closest to the one-end (22L) is the U-phase coil (U11). The number of the coils (C) is a multiple (M) (number M) of 3. In the example of FIG. 3, the number of the coils is 3.

The coil substrate 201 is formed of the one flexible substrate 22. The flexible substrate 22 forming the coil substrate 201 is divided into multiple portions. Therefore, the coil substrate 201 is also divided into multiple portions (P). The coil substrate 201 is formed of multiple portions (P), and the number of the portions (P) is N. The portions (P) forming the coil substrate 201 are positioned from the one-end (22L) to the other-end (22R). The first portion (P1) includes the one-end (22L) of the flexible substrate 22. The second portion (P2) is next to the first portion (P1). For example, N is the number of windings of the flexible substrate 22. The N-th portion (PN) includes the other-end (22R) of the flexible substrate 22.

In the example of FIG. 3, the number of the portions (P) is 2. The coil substrate 201 of FIG. 3 is formed of the first portion (P1) and the second portion (P2).

The first coil (C11), the second coil (C12) and the third coil (C13) are formed in the coil substrate 201.

The multiple coils (C) formed on the flexible substrate 22 are simultaneously formed. For example, the multiple coils (C) are formed on the flexible substrate 22 using a common alignment mark. Therefore, positions of the coils (C) are related to each other.

Figure 1C:
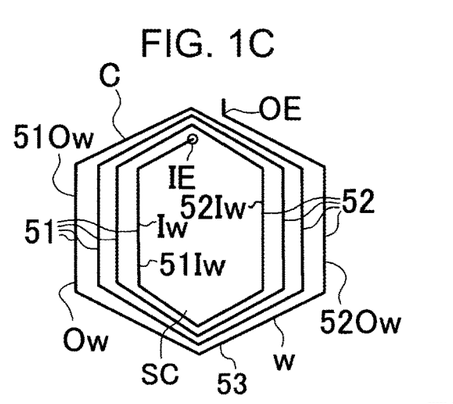
FIG. 1C is a plan view of wirings.

FIG. 1C illustrates an example of a coil (C). The coil (C) is formed of a center space (SC) and wirings (w) surrounding the center space (SC). The wirings (w) have an outer end (OE) and an inner end (IE). The wirings (w) are formed between the outer end (OE) and the inner end (IE). The wirings (w) forming the coil (C) are formed in a spiral shape. The center space (SC) is surrounded by an innermost wiring of the wirings (w) forming the coil (C). Among the multiple wirings (w), an innermost wiring (w) is an inner side wiring (Iw). An outermost wiring (w) is an outer side wiring (Ow). The coil (C) is formed around the center space (SC).

As illustrated in FIG. 1C, the wirings (w) include multiple first wirings 51 and multiple second wirings 52, the first wirings 51 facing the second wirings 52 across the center space. In one coil (C), the first wirings 51 are close to the one-end (22L), and the second wirings 52 are close to the other-end (22R). The first wirings 51 are formed substantially parallel to each other. The second wirings 52 are formed substantially parallel to each other. The first wirings 51 and the second wirings 52 are formed substantially parallel to each other. When the motor 10 is manufactured using the coil substrate 201 of the embodiment, an angle between a rotation direction (MR) of the motor illustrated in FIG. 1B and the first wirings 51 is substantially 90 degrees. An angle between a direction of a current flowing through the first wirings 51 and the rotation direction (MR) of the motor is substantially 90 degrees.

The wirings (w) further include third wirings 53 that connect the first wirings 51 and the second wirings 52.

Among the multiple first wirings 51, an outermost first wiring 51 is an outer side first wiring (51Ow).

Among the multiple first wirings 51, an innermost first wiring 51 is an inner side first wiring (51Iw). The inner side first wiring (51Iw) faces the center space (SC).

Among the multiple second wirings 52, an outermost second wiring 52 is an outer side second wiring (52Ow).

Among the multiple second wirings 52, an innermost second wiring 52 is an inner side second wiring (52Iw). The inner side second wiring (52Iw) faces the center space (SC).

Figure 1D:
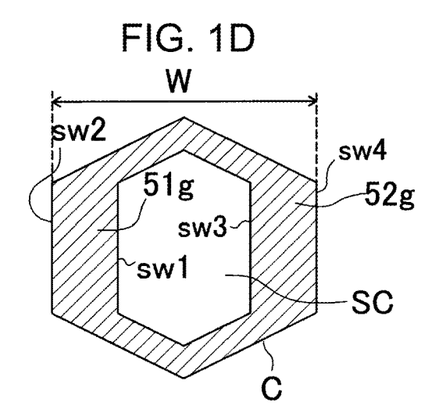
FIG. 1D is a plan view of a coil.
Figure 1E:
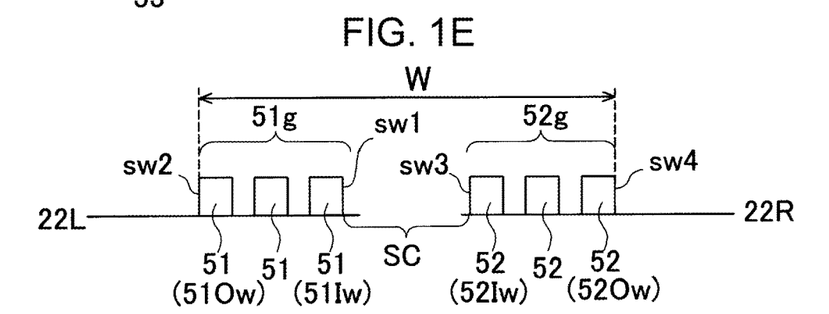
FIG. 1E is a cross-sectional view of the coil.

In FIG. 1D, the wirings (w) are grouped. By grouping the first wirings 51, a first wiring group (51g) is formed. By grouping the second wirings 52, a second wiring group (52g) is formed. FIG. 1E is a cross-sectional view of one coil (C). FIG. 1E illustrates cross sections of the first wirings 51 and the second wirings 52.

Each coil (C) has a distance (width) (W) illustrated in FIGS. 1D and 1E.

The first wirings 51 each have a first side wall (sw1) facing the center space (SC), and a second side wall (sw2) on an opposite side with respect to the first side wall (sw1). The second wirings 52 each have a third side wall (sw3) facing the center space (SC) and a fourth side wall (sw4) on an opposite side with respect to the third side wall (sw3). The distance (W) is a distance between the second side wall (sw2) of the outer side first wiring (51Ow) forming the m-th coil and the fourth side wall (sw4) of the outer side second wiring (52Ow) forming the m-th coil.

The distance (W) is measured along a straight line perpendicular to the first wirings 51.

The single coils of Japanese Patent Application Laid-Open Publication No. 2007-124892 are each formed of a wire. In contrast, the coils (C) of the embodiment are formed using a technology for a printed wiring board. Wirings (w) forming the coils (C) are formed by plating. Or, the wirings (w) forming the coils (C) are formed by etching a copper foil. The wirings (w) forming the coils (C) are formed using a semi-additive method, an M-Sap method, or a subtractive method.

The wirings (w) forming the coils (C) are formed using a technology for a printed wiring board. Therefore, a cross-sectional shape of each of the wirings (w) is substantially rectangular. According to the embodiment, the space factor of the coils (C) can be increased.

By winding the coil substrate 201, the motor coil substrate 20 of the embodiment is obtained. In this case, the coil substrate 201 is wound such that the portions (P) each form substantially one winding.

Figure 2A:
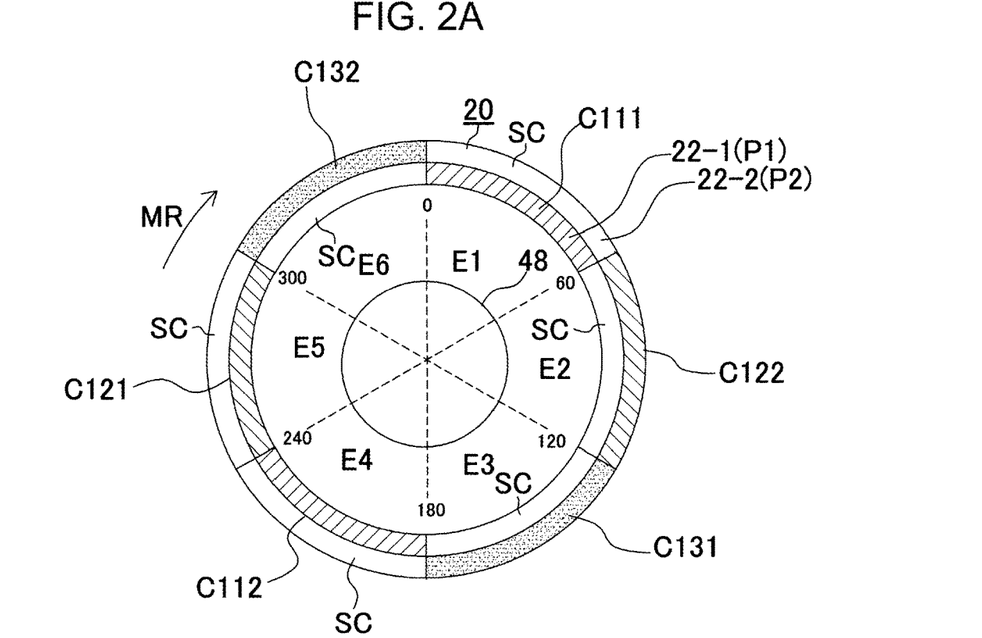
FIG. 2A is a schematic cross-sectional view of the motor coil substrate according to the embodiment.

An example of a method for winding the coil substrate 201 is described using FIG. 1B. The coil substrate 201 of FIG. 3 is formed of the first portion (P1) and the second portion (P2). Then, when the coil substrate 201 of FIG. 3 is wound, as illustrated in FIG. 1, the first portion (P1) forms substantially one winding. Further, the second portion (P2) connected to the first portion (P1) forms substantially one winding. In this case, as illustrated in FIGS. 1B and 2A, the first portion (P1) is wound on an inner side. The flexible substrate 22 forming the first portion (P1) is a first flexible substrate (22-1). Then, the second portion (P2) is wound on an outer side of the first portion (P1). The flexible substrate 22 that extends from the first flexible substrate (22-1) and forms the second portion (P2) is a second flexible substrate (22-2).

FIG. 2A schematically illustrates a cross section of the motor coil substrate 20. In FIG. 2A, the motor coil substrate 20 is cut in a plane parallel to the rotation direction (MR) of the motor 10. As illustrated in FIG. 2A, the motor coil substrate 20 can be divided into equal areas. One wiring group is positioned in each area. One first wiring group (51g) or one second wiring group (52g) is positioned in each area. In FIG. 2A, the motor coil substrate 20 is divided into 6 areas. A center angle of each area is substantially 60 degrees. The area between 0 and 60 degrees is the first area (E1). The area between 60 and 120 degrees is the second area (E2). Next to the second area (E2) is the third area (E3). Next to the third area (E3) is the fourth area (E4). Next to the fourth area (E4) is the fifth area (E5). Next to the fifth area (E5) is the sixth area (E6). The first wirings 51 or the second wirings 52 are positioned in each area.

As illustrated in FIG. 3, the coil substrate 201 has a coil (C) formed within one portion (P) that forms flexible substrate 22. Further, the coil substrate 201 has a coil (C) formed across two portions (P). The former is an in-one-portion coil and the latter is an in-two-portion coil. In the example of FIG. 3, the first coil (C11) and the third coil (C13) are in-one-portion coils, and the second coil (C12) is an in-two-portion coil. The first coil (C11) is formed on the first flexible substrate (22-1). The third coil (C13) is formed on the second flexible substrate (22-2). The first wirings 51 of the second coil (C12) are formed on the first flexible substrate (22-1), and the second wirings 52 of the second coil (C12) are formed on the second flexible substrate (22-2).

The number of in-one-portion coils (Number 1) and the number of in-two-portion coils (Number 2) satisfy the following relation.

Relation: (Number 1)/(Number 2)=2

In the embodiment, the first wiring group (C111) of the first coil (C11) (U11) is positioned in the first area (E1). The first wirings 51 of the first coil (C11) (U11) are positioned in the first area (E1).

The second wiring group (C122) of the second coil (C12) (V11) is positioned in the second area (E2). The second wirings 52 of the second coil (C12) (V11) are positioned in the second area (E2).

The first wiring group (C131) of the third coil (C13) (W11) is positioned in the third area (E3). The first wirings 51 of the third coil (C13) (W11) are positioned in the third area (E3).

The second wiring group (C112) of the first coil (C11) (U11) is positioned in the fourth area (E4). The second wirings 52 of the first coil (C11) (U11) are positioned in the fourth area (E4).

The first wiring group (C121) of the second coil (C12) (V11) is positioned in the fifth area (E5). The first wirings 51 of the second coil (C12) (V11) are positioned in the fifth area (E5).

The second wiring group (C132) of the third coil (C13) (W11) is positioned in the sixth area (E6). The second wirings 52 of the third coil (C13) (W11) are positioned in the sixth area (E6).

As illustrated in FIG. 2A, a wiring group of the U-phase coil, a wiring group of the V-phase coil, and a wiring group of the W-phase coil are positioned in the order of the wiring group of the U-phase coil, the wiring group of the V-phase coil, and the wiring group of the W-phase coil. Further, a first wiring group (51g) and a second wiring group (52g) are positioned in the order of the first wiring group (51g) and the second wiring group (52g). The first wiring groups (51g) and the second wiring groups (52g) are alternately positioned.

As illustrated in FIG. 2A, the magnet 48 is surrounded by the wiring groups. Therefore, the space factor of the coils can be increased. Further, the coils formed on the first flexible substrate (22-1) and the coils formed on the second flexible substrate (22-2) partially overlap each other. Therefore, the motor coil substrate 20 can be reduced in size.

The magnetic flux density in the rotation direction (MR) of the motor 10 can be made uniform. Rotation of the motor 10 can be made smooth.

Figure 2B:
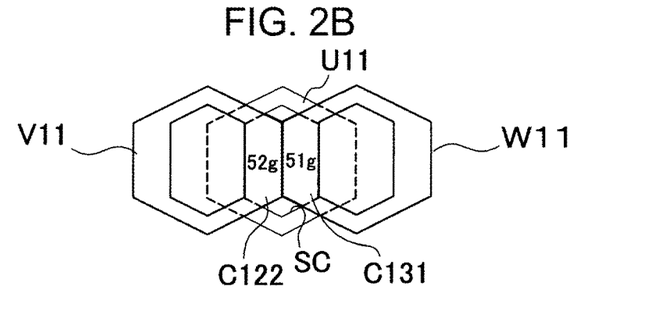
FIG. 2B is a schematic diagram illustrating overlapping of coils according to the embodiment.

As illustrated in FIGS. 2A and 2B, the second wiring group (52g) that forms the V-phase coil (V11) and the first wiring group (51g) that forms the W-phase coil (W11) are positioned on the center space (SC) of the U-phase coil (U11).

The second wiring group (52g) that forms the W-phase coil (W11) and the first wiring group (51g) that forms the U-phase coil (U11) are positioned on the center space (SC) of the V-phase coil (V11).

The second wiring group (52g) that forms the U-phase coil (U11) and the first wiring group (51g) that forms the V-phase coil (V11) are positioned on the center space (SC) of the W-phase coil (W11).

In this way, the wirings of the V-phase coil and the wirings of the W-phase coil are positioned on the center space (SC) of the U-phase coil. The wirings of the U-phase coil and the wirings of the W-phase coil are positioned on the center space (SC) of the V-phase coil. The wirings of the U-phase coil and the wirings of the V-phase coil are positioned on the center space (SC) of the W-phase coil. Wirings of out-of-phase coils are positioned on a center space (SC). Therefore, the wirings can be evenly positioned in the motor coil substrate 20. For example, the weight of the motor coil substrate 20 does not differ significantly within the motor coil substrate 20. Rotation of the motor coil substrate 20 can be made smooth.

As illustrated in FIG. 3, the coil (C11) formed on the first flexible substrate (22-1) has a first width (W1). The coil (C13) formed on the second flexible substrate (22-2) has a second width (W2). A coil (C) having the first width (W1) and a coil (C) having the second width (W2) are in-one-portion coils. The first width (W1) is smaller than the second width (W2).

In the motor coil substrate 20 of the embodiment, the second width (W2) is larger than the first width (W1). Therefore, the width of the wirings (w) of a coil on the second flexible substrate (22-2) can be increased. A resistance value of the wirings (w) of a coil on the second flexible substrate (22-2) can be reduced. A motor 10 having high efficiency can be provided.

As illustrated in FIG. 3, there are gaps (D1, D2) between adjacent coils. The gap (D1) is formed on the first flexible substrate (22-1), and the gap (D2) is formed on the second flexible substrate (22-2). The gap (D1) and the gap (D2) are substantially equal to each other in size. Required insulation intervals are maintained. The gaps (D1, D2) are each a distance between the fourth side wall (sw4) of an m-th coil and the second side wall (sw2) of an (m+1)-th coil. The number m is an integer equal to or greater than 1.

The motor coil substrate 20 of the embodiment is formed by winding the coil substrate 201 having multiple coils (C). The motor coil substrate 201 includes the first flexible substrate (22-1), and the second flexible substrate (22-2), which extends from the first flexible substrate (22-1) and is wound around the first flexible substrate (22-1). The first flexible substrate (22-1) does not have to include the one-end (22L). In this case, the first flexible substrate (22-1) is wound around a flexible substrate that includes the one-end (22L).

Modified Embodiment

The embodiment and a modified embodiment of the embodiment are different in the number of the coils (C) and the number of the portions (P). Other than these, the embodiment and the modified embodiment of the embodiment are substantially the same.

Figure 4:
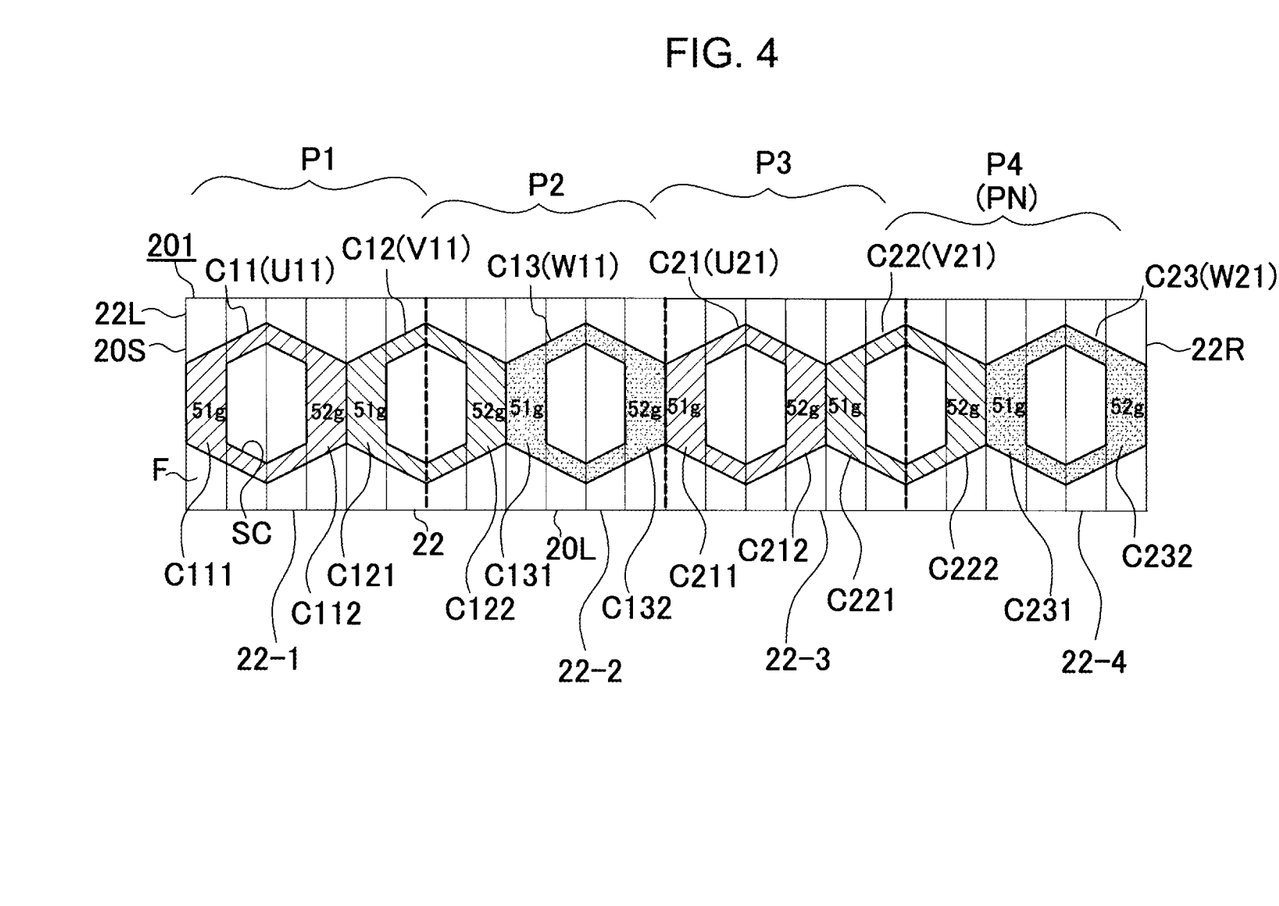
FIG. 4 illustrates a coil substrate according to a modified embodiment of the embodiment.

FIG. 4 illustrates a coil substrate 201 of the modified embodiment of the embodiment. As illustrated in FIG. 4, the coil substrate 201 of the modified embodiment is formed of four portions (P1, P2, P3, P4). A portion (first portion) (P1) including a one-end (22L) is formed of a first flexible substrate (22-1). A portion (second portion) (P2) extending from the first flexible substrate (22-1) is formed of a second flexible substrate (22-2). A portion (third portion) (P3) extending from the second flexible substrate (22-2) is formed of a third flexible substrate (22-3). A portion (fourth portion) (P4) extending from the third flexible substrate (22-3) is formed of a fourth flexible substrate (22-4). The fourth flexible substrate (22-4) includes an other-end (22R).

As illustrated in FIG. 4, the coil substrate 201 of the modified embodiment includes six coils (C) (C11, C12, C13, C21, C22, C23). The coil (C) closest to the one-end (22L) is the first coil (C11). The coil (C) next to the first coil (C11) is the second coil (C12). The coil (C) next to the second coil (C12) is the third coil (C13). The coil (C) next to the third coil (C13) is the fourth coil (C21). The coil (C) next to the fourth coil (C21) is the fifth coil (C22). The coil (C) next to the fifth coil (C22) is the sixth coil (C23). The sixth coil (C23) is closest to the other-end 22R. The first coil (C11) and the fourth coil (C21) are U-phase coils. The second coil (C12) and the fifth coil (C22) are V-phase coils. The third coil (C13) and the sixth coil (C23) are W-phase coils.

The first coil (C11), the third coil (C13), the fourth coil (C21) and the sixth coil (C23) are in-one-portion coils. The first coil (C11) is formed on the first flexible substrate (22-1). The third coil (C13) is formed on the second flexible substrate (22-2). The fourth coil (C21) is formed on the third flexible substrate (22-3). The sixth coil (C23) is formed on the fourth flexible substrate (22-4). The number of in-one-portion coils formed in each portion (P) is one.

The second coil (C12) and the fifth coil (C22) are in-two-portion coils. The second coil (C12) is formed on the first flexible substrate (22-1) and the second flexible substrate (22-2). The fifth coil (C22) is formed on the third flexible substrate (22-3) and the fourth flexible substrate (22-4).

Similar to the embodiment, by winding the coil substrate 201, a motor coil substrate 20 is obtained. In this case, the coil substrate 201 is wound such that the portions (P) each form substantially one winding. The j-th portion is wound on an outer side of the (j−1)-th portion. The number j is an integer equal to or larger than 2.

Figure 5A:
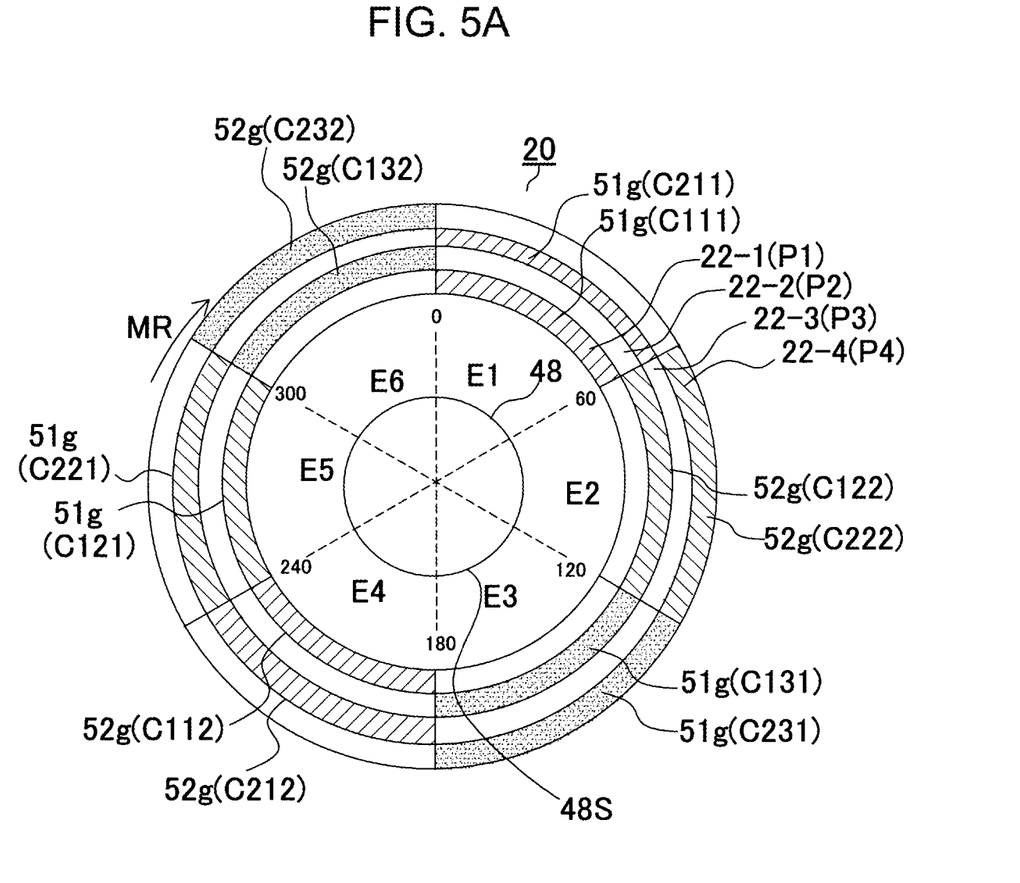
FIG. 5A is a schematic cross-sectional view of a motor coil substrate according to the modified embodiment of the present invention.

An example of a method for winding the coil substrate 201 is described using FIG. 5A. The coil substrate 201 illustrated in FIG. 4 is formed of the first portion (P1), the second portion (P2), the third portion (P3), and the fourth portion (P4). Then, when the coil substrate 201 of FIG. 4 is wound, as illustrated in FIG. 5A, the first portion (P1) forms substantially one winding. The second portion (P2) connected to the first portion (P1) forms substantially one winding. The third portion (P3) connected to the second portion (P2) forms substantially one winding. Then, the fourth portion (P4) connected to the third portion (P3) forms substantially one winding. In this case, as illustrated in FIG. 5A, the first portion (P1) is wound on an innermost side.

Similar to that in FIG. 2A, the motor coil substrate 20 of the modified embodiment is divided into 6 areas. A center angle of each area is substantially 60 degrees. In the modified embodiment, two wiring groups are positioned in each area.

The first wiring group (51g) of the first coil (C11) (U11) and the first wiring group (51g) of the fourth coil (C21) (U21) are positioned in the first area (E1). The first wiring group (51g) of the fourth coil (C21) (U21) is positioned on the first wiring group (51g) of the first coil (C11) (U11). The first wirings 51 of the fourth coil (C21) (U21) are positioned on the first wirings 51 of the first coil (C11) (U11). When currents flow through the coils (C), currents flowing in the same direction overlap each other.

The second wiring group (52g) of the second coil (C12) (V11) and the second wiring group (52g) of the fifth coil (C22) (V21) are positioned in the second area (E2). The second wiring group (52g) of the fifth coil (C22) (V21) is positioned on the second wiring group (52g) of the second coil (C12) (V11). The second wirings 52 of the fifth coil (C22) (V21) are positioned on the second wirings 52 of the second coil (C12) (V11). When currents flow through the coils (C), currents flowing in the same direction overlap each other.

The first wiring group (51g) of the third coil (C13) (W11) and the first wiring group (51g) of the sixth coil (C23) (W21) are positioned in the third area (E3). The first wiring group (51g) of the sixth coil (C23) (W21) is positioned on the first wiring group (51g) of the third coil (C13) (W11). The first wirings 51 of the sixth coil (C23) (W21) are positioned on the first wirings 51 of the third coil (C13) (W1). When currents flow through the coils (C), currents flowing in the same direction overlap each other.

The second wiring group (52g) of the first coil (C11) (U11) and the second wiring group (52g) of the fourth coil (C21) (U21) are positioned in the fourth area (E4). The second wiring group (52g) of the fourth coil (C21) (U21) is positioned on the second wiring group (52g) of the first coil (C11) (U11). The second wirings 52 of the fourth coil (C21) (U21) are positioned on the second wirings 52 of the first coil (C11) (U11). When currents flow through the coils (C), currents flowing in the same direction overlap each other.

The first wiring group (51g) of the second coil (C12) (V11) and the first wiring group (51g) of the fifth coil (C22) (V21) are positioned in the fifth area (E5). The first wiring group (51g) of the fifth coil (C22) (V21) is positioned on the first wiring group (51g) of the second coil (C12) (V11). The first wirings 51 of the fifth coil (C22) (V21) are positioned on the first wirings 51 of the second coil (C12) (V11). When currents flow through the coils (C), currents flowing in the same direction overlap each other.

The second wiring group (52g) of the third coil (C13) (W11) and the second wiring group (52g) of the sixth coil (C23) (W21) are positioned in the sixth area (E6). The second wiring group (52g) of the sixth coil (C23) (W21) is positioned on the second wiring group (52g) of the third coil (C13) (W11). The second wirings 52 of the sixth coil (C23) (W21) are positioned on the second wirings 52 of the third coil (C13) (W11). When currents flow through the coils (C), currents flowing in the same direction overlap each other.

The first wiring groups (51g) and the second wiring groups (52g) are alternately positioned. The same wiring groups of in-phase coils (C) overlap each other. For example, in-phase first wiring groups (51g) overlap each other. The same wirings of in-phase coils (C) overlap. For example, in-phase first wirings 51 overlap each other.

In the embodiment and the modified embodiment of the embodiment, the first wiring groups (51g) and the second wiring groups (52g) are alternately positioned along the rotation direction (MR) of the motor. The angle between the first wirings 51 and the rotation direction (MR) of the motor is substantially 90 degrees. Therefore, an angle between a direction of a current flowing through the first wirings 51 and the rotation direction (MR) of the motor is substantially 90 degrees.

Figure 5B:
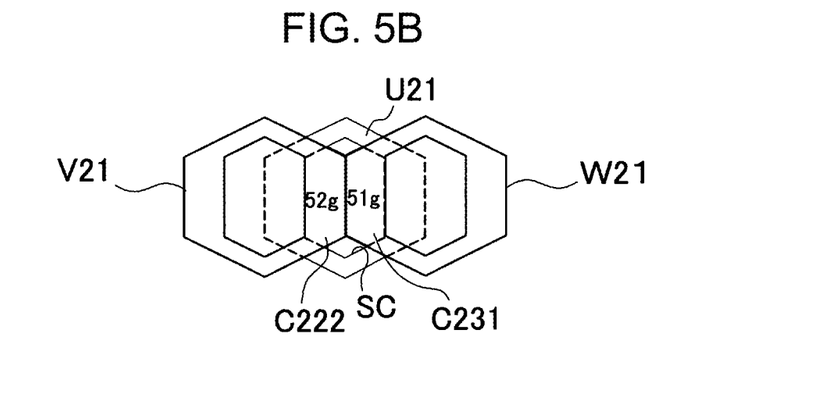
FIG. 5B is a schematic diagram illustrating overlapping of coils.

As illustrated in FIG. 5B, the coil (C) on the third flexible substrate (22-3) and the coil (C) on the fourth flexible substrate (22-4) partially overlap each other. The second wiring group (52g) forming the V-phase coil (V21) on the fourth flexible substrate (22-4) and the first wiring group (51g) forming the W-phase coil (W21) on the fourth flexible substrate (22-4) are positioned on the center space (SC) of the U-phase coil (U21) on the third flexible substrate (22-3). The second wirings 52 forming the V-phase coil (V21) on the fourth flexible substrate (22-4) and the first wirings 51 forming the W-phase coil (W21) on the fourth flexible substrate (22-4) are positioned on the center space (SC) of the U-phase coil (U21) on the third flexible substrate (22-3).

In the embodiment and the modified embodiment, the wirings (w) of a V-phase coil and the wirings (w) of a W-phase coil are positioned on the center space (SC) of a U-phase coil.

Figure 2C:
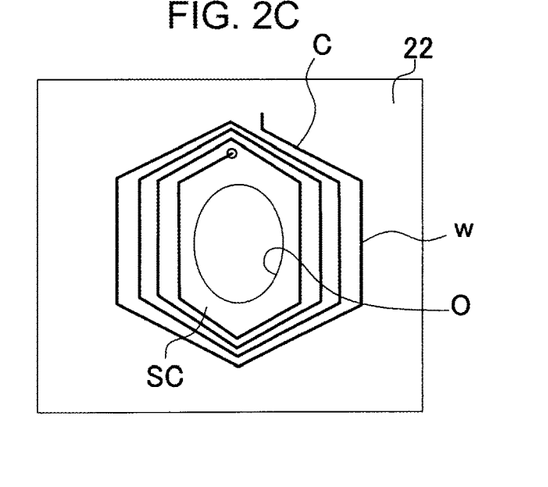
FIG. 2C illustrates a coil formed around an opening.

FIG. 2C illustrates a coil (C) formed around an opening (O).

In FIG. 2C, the opening (O) penetrating the flexible substrate 22 is formed in the center space (SC). The coil (C) is formed around the opening (O). The coil (C) is formed around the center space (SC). The wirings (w) that form the coil (C) are formed around the opening (O). The coil substrate 201 of the embodiment and the coil substrate 201 of the modified embodiment of the embodiment can have the opening (O).

The electric motor of Japanese Patent Application Laid-Open Publication No. 2007-124892 includes multiple single coils formed of wires. The coils are formed of wires. When the wires are thin, it is thought that it is difficult to wind the wires. For example, it is thought that the wires may break. It is thought that it is difficult to wind the wires with high positional accuracy. In this case, it is believed that a space factor is decreased. For example, it is thought that a small electric motor can be manufactured by thinning the wires of Japanese Patent Application Laid-Open Publication No. 2007-124892. However, it is thought that it is difficult to apply a large current to the coils when the wires are thin.

A motor coil substrate according to an embodiment of the present invention is formed by winding a coil substrate that includes a flexible substrate and multiple coils, the flexible substrate having a one-end and an other-end on an opposite side with respect to the one-end, and the coils being formed on the flexible substrate. The motor coil substrate is formed by winding the coil substrate N times. The number N is 2 or larger. The number of the coils is a multiple of 3. The flexible substrate includes: a first winding flexible substrate (first flexible substrate); and a second winding flexible substrate (second flexible substrate) that extends from the first flexible substrate and is wound around the first flexible substrate. The first flexible substrate includes the one-end. The second flexible substrate is positioned on an outer side of the first flexible substrate. The coils formed on the first flexible substrate and the coils formed on the second flexible substrate partially overlap each other.

According to an embodiment of the present invention, coils are formed of wirings. For example, the coils can be formed using a technology for a printed wiring board. Therefore, the wirings forming the coils can be formed to each have a substantially rectangular cross sectional shape. A space factor of the coils can be increased. The coils formed on the first flexible substrate and the coils formed on the second flexible substrate partially overlap each other. Therefore, the space factor of the coils can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A motor coil substrate, comprising:
a flexible substrate; and
a plurality of coils formed on a surface of the flexible substrate,
wherein the flexible substrate is wound N times where N is 2 or larger, the plurality of coils is formed in a multiple of 3 coils such that the 3 coils are positioned inline on the surface of the flexible substrate and that when the flexible substrate is wound N times, a first one of the 3 coils partially overlaps with second and third ones of the 3 coils, the flexible substrate includes a first flexible substrate and a second flexible substrate extending from the first flexible substrate and wound around the first flexible substrate, and the flexible substrate has a first end and a second end on an opposite side with respect to the first end such that the first flexible substrate has the first end of the flexible substrate and that the second flexible substrate is positioned on an outer side of the first flexible substrate.

2. The motor coil substrate according to claim 1, wherein the plurality of coils includes a U-phase coil, a V-phase coil and a W-phase coil and is formed from the first end to the second end of the flexible substrate such that the U-phase coil, the V-phase coil, and the W-phase coil are positioned in an order of the U-phase coil, the V-phase coil, and the W-phase coil.

3. The motor coil substrate according to claim 2, wherein a sum of a number of the coils formed on the first flexible substrate and a number of the coils formed on the second flexible substrate is 3.

4. The motor coil substrate according to claim 2, wherein the plurality of coils is formed such that a coil closest to the first end is the U-phase coil, that each of the coils comprises a wiring wound around a center space in a spiral shape, and that part of the wiring forming the V-phase coil and part the wiring forming the W-phase coil are positioned to overlap on the center space of the U-phase coil.

5. The motor coil substrate according to claim 1, wherein the flexible substrate includes a third flexible substrate extending from the second flexible substrate and wound around the second flexible substrate such that the third flexible substrate is positioned on an outer side of the second flexible substrate, and a fourth flexible substrate extending from the third flexible substrate and wound around the third flexible substrate such that the fourth flexible substrate is positioned on an outer side of the third flexible substrate, and the plurality of coils is formed such that a coil or coils formed on the third flexible substrate partially overlap with a coil or coils formed on the fourth flexible substrate.

6. The motor coil substrate according to claim 5, wherein the plurality of coils includes a U-phase coil, a V-phase coil and a W-phase coil and is formed from the first end to the second end such that the U-phase coil, the V-phase coil, and the W-phase coil are positioned in an order of the U-phase coil, the V-phase coil, and the W-phase coil.

7. The motor coil substrate according to claim 6, wherein a sum of a number of the coils formed on the first flexible substrate and a number of the coils formed on the second flexible substrate is 3, and a sum of a number of the coils formed on the third flexible substrate and a number of the coils formed on the fourth flexible substrate is 3.

8. The motor coil substrate according to claim 6, wherein the plurality of coils formed such that a coil closest to the first end is the U-phase coil, that each of the coils comprises a wiring wound around a center space in a spiral shape, that part of the wiring forming the V-phase coil and part the wiring forming the W-phase coil are positioned to overlap on the center space of the U-phase coil, and that part of the wiring forming the V-phase coil on the fourth flexible substrate and part of the wiring forming the W-phase coil on the fourth flexible substrate are positioned to overlap on the center space of the U-phase coil on the third flexible substrate.

9. The motor coil substrate according to claim 8, wherein the plurality of coils is formed such that part of the wiring forming the U-phase coil on the third flexible substrate is positioned to overlap on part of the wiring forming the U-phase coil on the first flexible substrate.

10. The motor coil substrate according to claim 4, wherein the wiring has a plurality of first wiring portions and a plurality of second wiring portions such that the first wiring portions is facing the second wiring portions across the center space, that the first wiring portions are formed substantially in parallel to each other, that the second wiring portions are formed substantially in parallel to each other, and that the first wiring portions are formed substantially in parallel to the second wirings, and the plurality of coils is formed such that when a magnet is positioned inside the flexible substrate, an angle between the first wiring portions and a rotation direction of a motor comprising the motor coil substrate and the magnet is substantially 90 degrees.

11. The motor coil substrate according to claim 8, wherein the wiring has a plurality of first wiring portions and a plurality of second wiring portions such that the first wiring portions is facing the second wiring portions across the center space, that the first wiring portions are formed substantially in parallel to each other, that the second wiring portions are formed substantially in parallel to each other, and that the first wiring portions are formed substantially in parallel to the second wirings, and the plurality of coils is formed such that when a magnet is positioned inside the flexible substrate, an angle between the first wiring portions and a rotation direction of a motor comprising the motor coil substrate and the magnet is substantially 90 degrees.

12. The motor coil substrate according to claim 10, wherein the plurality of coils is formed such that the plurality of first wiring portions includes an outermost first wiring portion forming an outer side first wiring portion, that the outer side first wiring has a first side wall facing the center space and a second side wall on an opposite side with respect to the first side wall, that the plurality of second wiring portions includes an outermost second wiring portion forming an outer side second wiring, and that the outer side second wiring has a third side wall facing the center space and a fourth side wall on an opposite side with respect to the third side wall, that a coil or coils on the first flexible substrate have a first width, that a coil or coils on the second flexible substrate have a second width that is larger than the first width, and that each of the first width and the second width is a distance between the second side wall and the fourth side wall.

13. The motor coil substrate according to claim 12, wherein the plurality of coils is formed such that a first gap is formed between coils formed on the first flexible substrate, that a second gap is formed between coils formed on the second flexible substrate, and that the first gap and the second gap are substantially equal to each other.

14. The motor coil substrate according to claim 1, wherein the plurality of coils is formed such that the plurality of coils has a plurality of center spaces respectively and is formed around the plurality of center spaces respectively, and the flexible substrate has a plurality of openings formed such that the plurality of openings is formed in the plurality of center spaces respectively and penetrating through the flexible substrate.

15. The motor coil substrate according to claim 1, wherein a sum of a number of the coils formed on the first flexible substrate and a number of the coils formed on the second flexible substrate is 3.

16. The motor coil substrate according to claim 2, wherein the plurality of coils is formed such that the plurality of coils has a plurality of center spaces respectively and is formed around the plurality of center spaces respectively, and the flexible substrate has a plurality of openings formed such that the plurality of openings is formed in the plurality of center spaces respectively and penetrating through the flexible substrate.

17. The motor coil substrate according to claim 3, wherein the plurality of coils is formed such that the plurality of coils has a plurality of center spaces respectively and is formed around the plurality of center spaces respectively, and the flexible substrate has a plurality of openings formed such that the plurality of openings is formed in the plurality of center spaces respectively and penetrating through the flexible substrate.

18. The motor coil substrate according to claim 4, wherein the plurality of coils is formed such that the plurality of coils has a plurality of center spaces respectively and is formed around the plurality of center spaces respectively, and the flexible substrate has a plurality of openings formed such that the plurality of openings is formed in the plurality of center spaces respectively and penetrating through the flexible substrate.

19. The motor coil substrate according to claim 5, wherein the plurality of coils is formed such that the plurality of coils has a plurality of center spaces respectively and is formed around the plurality of center spaces respectively, and the flexible substrate has a plurality of openings formed such that the plurality of openings is formed in the plurality of center spaces respectively and penetrating through the flexible substrate.

20. A motor, comprising:
the motor coil substrate of claim 1; and
a magnet positioned inside the motor coil substrate.

* * * * *